United States Patent
Diery et al.

[15] 3,666,779
[45] May 30, 1972

[54] SULFONAMIDO CARBOXYLIC ACIDS

[72] Inventors: Helmut Diery; Siegbert Rittner, both of Kelkheim, Taunus; Horst Lorke, Frankfurt am Main, all of Germany

[73] Assignee: Farbwerke Hoechst Aktiengesellschaft vormals Meister Lucius & Bruning, Frankfurt am Main, Germany

[22] Filed: July 11, 1968

[21] Appl. No.: 743,926

[30] Foreign Application Priority Data

July 15, 1967 Germany .................. P 16 44 893.4

[52] U.S. Cl. .................. 260/397.7, 260/401, 260/465 D, 260/518 A, 260/518 R, 260/519
[51] Int. Cl. .................................................. C07c 143/80
[58] Field of Search .................. 260/518, 397.7, 465 D, 519, 260/401

[56] References Cited

UNITED STATES PATENTS 3,379,715  4/1968  Chiddix et al. .................. 260/397.7

*Primary Examiner*—Lorraine A. Weinberger
*Assistant Examiner*—L. Arnold Thaxton
*Attorney*—Curtis, Morris & Safford

[57] ABSTRACT

Agents in aqueous metal-working liquids having corrosion inhibiting action and having the general formula

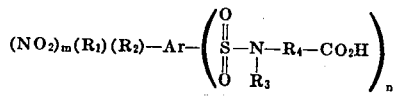

2 Claims, No Drawings

SULFONAMIDO CARBOXYLIC ACIDS

It is known that long-chain aliphatic sulphonamidocarboxylic acids possess affinity for metal and are used in aqueous solution or in mineral oil-containing emulsion in the metal-working industry both as agents for machining when boring, thread-cutting, turning, milling, sawing and grinding articles being worked and also for non-cutting shaping when drawing or rolling, and, in addition thereto, during high frequency hardening when water or aqueous solutions are used. The range of use of this class of compounds is however limited. In accordance with their constitution, these substances are capillary-active and oleophilic in their properties; they are therefore more or less well suited for use as emulsifiers by themselves or in combination with others, for the emulsification of vegetable or animal oils, mineral oils, fat oils, fatty acids, lubricating greases and the like. Emulsions of this nature however show a series of disadvantages both in practical manipulation and also in properties. Thus water of low hardness must as far as possible be used to manufacture such emulsions. The special precautions must be observed when using the emulsions. It is known that emulsions change their composition under working conditions. They lose either water or oil and this in turn makes it essential to have constant checking of the additions of oil or water. Emulsions frequently cream, decompose under the influence of excessively high temperatures or are attacked by bacteria.

It is a further disadvantage that emulsions are opaque so that the article being worked cannot be observed during the working process. Finally, spent emulsions must be broken in a plant after they have been used, for sewage reasons. Attempts have for this reason been made to develop oil-free water water-soluble cooling lubricants having corrosion protective action to iron or iron-containing alloys, which are effective even at high dilution and which do not show the disadvantages, described above, of the emulsions. As such water-soluble products, those based on long-chain alkyl-sulphonamidocarboxylic acids or long-chain alkylaryl-sulphonamidocarboxylic acids have been proposed.

However these products were also not able to afford full satisfaction. Thus for example the corrosion protection effect is inadequate for many purposes. Other disadvantageous properties, such as excessive foaming or adhesion to the machines also frequently interfere. Other oil-free metal-working liquids which are used do not have as great a tendency to foam. Against this they however possess a low corrosion protection action.

It has now surprisingly been found that sulphonamidocarboxylic acids containing nitro groups, of general formula I
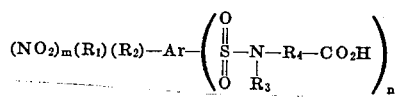

in the form of their salts with inorganic or organic bases in aqueous liquids are particularly advantageously suitable for use as metal-working agents having a highly effective corrosion inhibiting action towards iron and iron-containing metal compositions (alloys) and excellent lubricating action coupled with a low tendency to foam.

In formula I $R_1$ and $R_2$ denote hydrogen, fluorine, chlorine, bromine or an alkyl or alkoxy residue having one to four carbon atoms, wherein the sum of the carbon atoms of the two residues $R_1$ and $R_2$ must not exceed the number seven, preferably the number four, Ar denotes a benzene or naphthalene residue, $R_3$ denotes hydrogen, an alkyl residue having not more than four carbon atoms, the β-cyanoethyl residue or a hydroxyalkyl residue having two to four carbon atoms, $R_4$ denotes an alkylene residue having more than two, preferably more than four, carbon atoms in the chain which may furthermore optionally be substituted by methyl or ethyl groups, and $m$ and $n$ are each 1 or 2.

In order to manufacture the compounds of formula I, nitroarylsulphonyl chlorides of formula II,

in which $R_1$, $R_2$, Ar and m have the abovementioned significance, are condensed, in the presence of acid-binding agents, with aliphatic aminoacids of formula III,

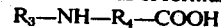

wherein $R_3$ and $R_4$ have the abovementioned significance. The reaction may be effected in aqueous solution or in an inert solvent. In aqueous solution, the process is generally carried out at temperatures between about 0° and 50° C, appropriately at room temperature or a slightly elevated temperature. Herein the nitroarylsulphonyl chloride is added slowly, in portions, to the solution of the aminoacid. In order to complete the reaction the mixture is, after addition of the aminoacid, appropriately further stirred for a period. The free nitroarylsulphonamidoalkylenecarboxylic acid can be precipitated from the reaction mixture by adjusting to a pH-value of 1–3. Mineral acids such as hydrochloric acid, sulphuric acid or phosphoric acid are generally used for acidifying the reaction mixture.

Any desired inorganic or organic bases may be considered for the formation of the salts with the abovementioned sulphonamidocarboxylic acids, provided they lead to water-soluble products. Herein the term "water-soluble" is also to be understood to include the colloidal, emulsoid or suspensoid state. For the formation of the salt it is for example possible to use alkalis or preferably organic bases such as for example monomethylamine, dimethylamine and trimethylamine, monoethylamine, diethylamine and triethylamine, monoisopropylamine, monobutylamine and dibutylamine, 3-methoxypropylamine, mono-2-ethylhexylamine, dimethylaminopropylamine, monoethanolamine, diethanolamine and triethanolamine, 3-aminopropanol, monomethylethanolamine, dimethylethanolamine, monoisopropanolamine, triisopropanolamine, cyclohexylamine, N,N-dimethylcyclohexylamine, morpholine, pyridine, quinoline, ethylene diamine, diethylene triamine, pentaethylene hexamine or also amines, for example fatty amines, which have been reacted with alkylene oxides having two to four carbon atoms, and similar materials.

For the salt formation, the components may be employed in a stoichiometric ratio or also with either component in excess.

In order to manufacture metal-working liquids according to the present invention, which may preferably be clear aqueous solutions but at times also emulsions or dispersions, the smallest possible quantities of the auxiliary agents will be employed for economic considerations. In general concentration of the auxiliary agents of less than about 10 percent by weight suffices. It is a significant advantage of the corrosion protection — metal-working agents according to the invention that they are very effective even at low concentration. Thus, using the products according to the invention, an adequate effect can in many cases still be achieved at concentrations of about 0.5 percent by weight.

Aqueous liquids which contain the agents of the present invention may be applied as coolants, lubricants and rinsing liquids etc in the usual metal working processes for iron or iron-containing alloys. The metal working processes may comprise cutting operations such as drilling, cutting, turning, milling, sawing, grinding, and non-cutting operations such as drawing, rolling, pressing, and also quenching during hardening. The application of aqueous metal working liquids according to the invention has proved particularly advantageous for example in grinding operations, because it prevented clogging and sticking of the grinding disks generally occurring when oily agents are used. At the same time, the new agents prevent corrosion of the ground work pieces which as such are particularly liable to corrosion.

It is essential for the sulphonamidocarboxylic acids in formula I that the alkylene residue $R_4$ should have a chain length of at least three carbon atoms. In general it is possible to use compounds in which the alkylene chain of the residue $R_4$ comprises up to about 15 carbon atoms, preferably five to 15 carbon atoms. Particularly suitable are compounds which contain as the residue $R_3$, not hydrogen, but an alkyl group such as the methyl or the ethyl group. The following may be mentioned by way of examples of compounds of formula I to be used in accordance with the invention: o-nitrobenzenesulphonyl-δ-aminovaleric acid, o-nitrobenzenesulphonyl-N-methyl-δ-aminovaleric acid, m-nitrobenzenesulphonyl-ϵ-aminocaproic acid, o-nitrobenzene-sulphonyl-N-ethyl-ϵ-aminocaproic acid, m-nitrobenzene-sulphonyl-N-butyl-ϵ-aminocaproic acid, 4-methoxy-2-nitrobenzenesulphonyl-δ-aminovaleric acid, 4-methoxy-2-nitrobenzenesulphonyl-ϵ-aminocaproic acid, 3,5-dinitro-4-chloro-benzenesulphonyl-δ-aminovaleric acid, 3,5-dinitro-4-chloro-benzenesulphonyl-N-methyl-ϵ-aminocaproic acid, m-nitrobenzenesulphonyl-N-methyl-δ-amino-octane-ϵ-carboxylic acid, 1-nitronaphthalenesulphonyl-ϵ-aminocaproic acid, 1-nitronaphthalenesulphonyl-N-methyl-ϵ-aminocaproic acid, m-nitrobenzenesulphonyl-ω-aminoundecane-acid, nitrotoluenesulphonyl-N-methyl-ϵ-aminocaproic acid, m-nitrobenzenesulphonyl-δ-aminobutyric acid, 4-ethoxy-2-nitrobenzenesulphonyl-δ-aminovaleric acid, 4-fluoro-2-nitro-benzenesulphonyl-ϵ-aminocaproic acid, 3-nitro-(1,5)-di-benzenesulphonyl-ϵ-aminocaproic acid, m-nitrobenzenesulphonyl-N-β-cyanoethyl-β-aminocaproic acid and m-nitrobenzenesulphonyl-N-β-hydroxy-ethyl-ϵ-aminocaproic acid. The manufacture of the new nitroaryl-sulphonamidoalkylene-carboxylic acids which are suitable for salt formation will be illustrated with a series of typical examples of syntheses.

EXAMPLE 1

131.18 parts by weight of ϵ-aminocaproic acid are dissolved in an aqueous solution of 48 parts by weight of sodium hydroxide and 600 parts by weight of water in a 4-necked round flask equipped with a very rapid stirrer unit and an internal thermometer. 232.7 parts by weight of freshly prepared m-nitrobenzenesulphonyl chloride are then introduced into the solution in portions over the course of 3 hours, while stirring intensively. A pH-value of the solution of between 12.5 and 13 and an internal temperature of 25° to 30° C is continuously ensured by constant dropwise addition of a concentrated aqueous sodium hydroxide solution and external cooling. The mixture is then stirred for a further 1 hour and the aqueous concentrate is carefully filtered off. The filtrate is adjusted to a pH-value of 1–2 with concentrated hydrochloric acid. Hereupon the m-nitro-benzenesulphonyl-ϵ-aminocaproic acid precipitates in a crystalline form. It is filtered off and is obtained in a quantity of 280 parts by weight having an acid number of 170.

This crude product can immediately be used for the manufacture of corrosion protection and metal-working agents. The m-nitrobenzenesulphonyl-ϵ-aminocaproic acid is obtained pure by recrystallization from water/ethanol.

Melting point = 116–117°C
Acid number, calculated = 177.5
Acid number, found = 177.0
N calculated = 8.8
N found = 8.3
S calculated = 10.1
S found = 10.2

EXAMPLE 2

131.18 parts by weight of ϵ-aminocaproic acid are reacted with 232.7 parts by weight of m-nitrobenzenesulphonyl chloride under analogous reaction conditions to those in example 1. Thereafter 138.7 parts by weight of dimethylsulphate and 60 parts by weight of 32 percent strength (percent by weight) of sodium hydroxide solution are added dropwise over 90 minutes, with an initial temperature of 25° – 30° C. The temperature of the mixture hereupon rises to 42° – 45° C.

The mixture is thereafter stirred for a further ½ hour and then warmed to 50° C for a further 30 minutes. 200 parts by weight of water are then added to the mixture which is boiled vigorously for 15 minutes. Thereafter the condensate, while hot, is adjusted to pH-value 1–2 by means of concentrated hydrochloric acid whereupon the crude m-nitrobenzenesulphonyl-N-methyl-ϵ-aminocaproic acid precipitates as a thick brown oil which after standing for some hours solidifies to give a wax-like block of crystals. 350 parts by weight of a still moist crude product of acid number 155 are thus obtained, and this material can be directly employed for the manufacture of the corrosion protection and metal-working agents.

The pure m-nitrobenzenesulphonyl-N-methyl-ϵ-aminocaproic acid is obtained by recrystallization from water/ethanol.

Melting point = 82–84°C
Acid number, calculated = 170
Acid number, found = 170
N calculated = 8.5
N found = 8.4
S calculated = 9.7
S found = 9.7

EXAMPLE 3

131.18 parts by weight of ϵ-aminocaproic acid are condensed with 232.7 parts by weight of m-nitrobenzenesulphonyl chloride as explained in example 1. The condensate is then N-alkylated with 169.5 parts by weight of diethylsulphate under analogous reaction conditions to those in example 2. After acidification and isolation as explained in detail in example 2, 350 parts by weight of the oily crude product of m-nitrobenzenesulphonyl-N-ethyl-ϵ-aminocaproic acid of acid number 150 are obtained and are directly used for the preparation of corrosion protection and metal-working agents.

EXAMPLE 4

131.18 parts by weight of ϵ-aminocaproic acid are reacted with 232.7 parts by weight of o-nitrobenzenesulphonyl chloride similarly to example 1. After working-up and isolation, about 300 parts by weight of o-nitrobenzenesulphonyl-ϵ-aminocaproic acid of acid number 170 are obtained and are directly further processed.

EXAMPLE 5

131.1 parts by weight of ϵ-aminocaproic acid are reacted with 251.6 parts by weight of freshly prepared 4-methoxy-2-nitrobenzenesulphonyl chloride under analogous reaction conditions to example 1. After working-up and isolation (analogously to example 2) 320 parts by weight of 4-methoxy-2-nitrobenzenesulphonyl-ϵ-aminocaproic acid of acid number 147 are obtained and are directly further processed into corrosion protection and metal-working agents.

EXAMPLE 6

201.3 parts by weight of ω-aminoundecane-acid are dissolved in an aqueous-alcoholic solution manufactured from 48 parts by weight of sodium hydroxide, 500 parts by weight of water and 100 parts by weight of propanol-2, in an apparatus as described in example 1. Thereafter 232.7 parts by weight of freshly prepared m-nitrobenzenesulphonyl chloride are introduced in portions into the solution over the course of 4 hours while stirring vigorously. Similarly to example 1, a pH-value of a mixture of 12.5 – 13 and an internal temperature of 25° – 30° C is ensured by constant dropwise addition of a concentrated aqueous sodium hydroxide solution and external cooling. Thereafter the mixture is stirred for a further 1 hour, propanol-2 is removed by distillation in vacuo at 40° C, the mixture is carefully filtered, and the m-nitrobenzenesulphonyl-ω-aminoundecane-acid is precipitated from the filtrate by means of concentrated hydrochloric acid at pH 1 – 2. 360 parts by weight of a crude product of acid number 135 are thus obtained. The pure m-nitrobenzenesulphonyl-ω-aminoundecane-acid (melting point = 112° – 113° C) is obtained in a crystalline form by recrystallization from water/ethanol.

Acid number, calculated = 145
Acid number, found = 140/142.

EXAMPLE 7

48 parts by weight of ε-aminocaproic acid are condensed with 100 parts by weight 3,5-dinitro-4-chlorobenzene-1-sulphonyl chloride under analogous reaction conditions to example 1. After working-up and isolation, 110 parts by weight of 3,5-dinitro-4-chlorobenzenesulphonyl-ε-aminocaproic acid of acid number 130 are obtained and this can, after neutralization with bases, be directly employed for the end uses mentioned. The pure 3,5-dinitro-4-chlorobenzenesulphonyl-ε-aminocaproic acid is isolated by recrystallization from water/ethanol (melting point = 174° C) (with simultaneous decomposition).

Acid number, calculated = 141.5
Acid number, found = 138/139

EXAMPLE 8

48 parts by weight of ε-aminocaproic acid are reacted with 100 parts by weight of 3,5-dinitro-4-chlorobenzene-1-sulphonyl chloride under analogous reaction conditions to example 1. Thereafter the product is N-alkylated with 46.2 parts by weight of dimethylsulphate and 20 parts by weight of a 32 percent strength (percent by weight) sodium hydroxide solution, analogously to example 2. After working-up and isolation, about 120 parts by weight of 3,5-dinitro-4-chlorobenzenesulphonyl-N-methyl-ε-aminocaproic acid of acid number 125 are obtained. The pure 3,5-dinitro-4-chlorobenzenesulphonyl-N-methyl-ε-aminocaproic acid is isolated by recrystallization from water/ethanol (melting point = 78° C).

Acid number, calculated = 136.8
Acid number, found = 134/135

EXAMPLE 9

48 parts by weight of ε-aminocaproic acid are reacted with 90.2 parts by weight of 5-nitronaphthalene-1-sulphonyl chloride under analogous reaction conditions to those of example 1. Thereafter the material is N-alkylated with 46.2 parts by weight of dimethylsulphate and 20 parts by weight of 32 percent strength (percent by weight) sodium hydroxide solution under similar conditions to example 2. After filtering, and acidifying the condensate with concentrated hydrochloric acid to pH 1 – 2, about 83 parts by weight of the 5-nitronaphthalene-(1)-sulphonyl-N-methyl-ε-aminocaproic acid of acid number 130 are obtained. The crude product may, after neutralization with various bases, be directly used as a corrosion protection and metal-working agent.

The compounds according to the invention show when applied in aqueous liquids very good corrosion protection behavior towards iron or iron-containing alloys, an excellent lubricating action and a very low tendency to foaming. This is surprisingly the case even in the case of products based on long-chain aminocarboxylic acids, for example m-nitrobenzenesulphonyl-ω-aminoundecane-acid.

The advantageous action of the products according to the invention as regards corrosion protection, lubricating action with low tendency to foaming is for example to be seen in a comparison with a commercially available product based on a long-chain aliphatic sulphonamidocarboxylic acid.

The superiority of the products according to the invention is also present compared to compounds of analogous structure corresponding to formula I, in which the alkylene residue $R_4$ however comprises fewer than three carbon atoms in the chain.

The advantages of the products according to the invention compared to these compounds and compared to the known commercially available long-chain aliphatic sulphonamidocarboxylic acids may be seen from the investigational results summarized in the Tables which follow. A comparison of the figures for the lubricating action of two aromatic sulphonamidocarboxylic acid salts of analogous structure which only differ by a nitro group in the aromatic nucleus, for example benzenesulphonyl-N-methyl-ε-aminocaproic acid (Compound 2) and m-nitrobenzenesulphonyl-N-methyl-ε-aminocaproic acid (Compound 5) shows the surprising advantage which compounds containing nitro groups additionally offer as regards the lubricating effect.

In these investigations the corrosion protection action of the various products I) was tested by the so-called Herbert Test with steel filings on a grey cast-iron plate (compare "IP-Standards for Petroleum and its Products," IP 125/63 (T)), and II) by the same test method but using grey cast-iron filings (GG 22) on steel plates. The lubricating action was investigated by using the abrasion wear balance according to Reichert, with the abrasion area "F" being measured in $mm^2$ and the specific surface pressure in $kg/cm^2$. The foaming action was determined according to DIN 53902 at 25° C.

The assessment of the corrosion protection according to the two investigational methods I) and II) which were used was carried out according to the following rating scale:

| Designation | Corrosion Protection |
| --- | --- |
| +++ | very good |
| ++(+) | good |
| ++ | adequate |
| + | present but inadequate |
| —(-) | only slight |
| — | zero |

In detail, the following products were employed for the investigations:

Compound 1

Alkylsulphonamidocarboxylic acid-triethanolammonium salt with an average of 16 C-atoms in the alkyl residue (comparison substance)

Compound 2

Benzenesulphonyl-N-methyl-ε-aminocaproic acid-triethanolammonium salt (comparison substance)

Compound 3 m-Nitrobenzenesulphonyl-N-methyl-α-aminoacetic acid-triethanolammonium salt

Compound 4 m-Nitrobenzenesulphonyl-γ-aminobutyric acid-triethanolammonium salt

Compound 5 m-Nitrobenzenesulphonyl-N-methyl-ε-amino-caproic acid-triethanolammonium salt

Compound 6 o-Nitrobenzenesulphonyl-N-methyl-ε-amino-caproic acid-triethanolammonium salt

Compound 7 o-Nitrobenzenesulphonyl-N-ethyl-ε-amino-caproic acid-triethanolammonium salt

Compound 8

4-Methoxy-2-nitrobenzenesulphonyl-ε-amino-caproic acid-triethanolammonium salt

Compound 9

3,5-Dinitro-4-chlorobenzenesulphonyl-N-methyl-ε-aminocaproic acid-triethanolammonium salt wherein $R_1$ and $R_2$ denote hydrogen, fluorine, chlorine, bromine, an alkyl residue or an alkoxy residue having one to four carbon atoms, with the sum of the carbon atoms of the residues $R_1$ and $R_2$ not exceeding the number seven, Ar denotes a benzene or naphthalene residue, $R_3$ denotes hydrogen, an alkyl residue having not more than four carbon atoms, the β-cyanoethyl residue or a hydroxyalkyl residue having two to four carbon atoms, $R_4$ denotes an alkylene radi-

| No. of compound | Concentration of aqueous solution (percent) by weight | Corrosion protection effect | | | | | | Lubricating effect load 1,500 g. 100 running meters in spring water | | Foaming power |
|---|---|---|---|---|---|---|---|---|---|---|
| | | I steel filings/grey cast-iron plate | | | II grey cast-iron filings/steel plate | | | Abrasion (mm.²) | Specific surface pressure (kg./cm.²) | |
| | | Spring water, 20° dH | Water, 10° dH | E water* | Spring water, 20° dH | Water, 10° dH | E water* | | | |
| 1 | 5.0 | +++ | +++ | ++− | −−(−) | −−− | −−− | 30 | 100 | Very strong. |
| | 3.0 | +++ | +++ | ++− | −−− | −−− | −−− | | | Do. |
| | 2.0 | ++(+) | ++− | +−− | −−− | −−− | −−− | | | |
| | 1.0 | ++− | ++− | +−− | −−− | −−− | −−− | | | |
| | 0.5 | −−− | −−− | −−− | −−− | −−− | −−− | 32.2 | 93 | Do. |
| 2 | 5.0 | +++ | +++ | +++ | +++ | +++ | +++ | 23 | 131 | Slight. |
| | 3.0 | +++ | +++ | +++ | +++ | +++ | +++ | 32 | 94 | Do. |
| | 2.0 | +++ | +++ | +++ | ++(+) | ++(+) | +++ | | | Do. |
| | 1.0 | +++ | +++ | +++ | +++ | +++ | +++ | 32 | 94 | Do. |
| | 0.5 | −−− | ++− | +++ | | | | | | Do. |
| 3 | 5.0 | | | | −−− | −−− | −−− | 30 | 100 | Do. |
| | 3.0 | | | | | | | | | Do. |
| | 2.0 | | | | | | | | | |
| | 1.0 | −−− | | | | | | | | Do. |
| | 0.5 | −−− | | | | | | | | Do. |
| 4 | 5.0 | +++ | +++ | +++ | +++ | +++ | +++ | 23.0 | 130 | Do. |
| | 3.0 | +++ | +++ | +++ | +++ | +++ | +++ | | | Do. |
| | 2.0 | +++ | +++ | +++ | +++ | +++ | +++ | | | Do. |
| | 1.0 | +++ | +++ | +++ | −−− | −−− | | 31.6 | 95 | Do. |
| | 0.5 | −−− | −−− | −−− | −−− | | | | | Do. |
| 5 | 5.0 | +++ | +++ | +++ | +++ | +++ | +++ | 10.5 | 285 | Do. |
| | 3.0 | +++ | +++ | +++ | +++ | +++ | +++ | | | Do. |
| | 2.0 | +++ | +++ | +++ | +++ | +++ | +++ | | | Do. |
| | 1.0 | +++ | +++ | +++ | +−− | +−− | +++ | 22.8 | 132 | Do. |
| | 0.5 | ++(+) | ++(+) | ++(+) | | | | | | Do. |
| 6 | 5.0 | +++ | +++ | +++ | +++ | +++ | +++ | 18.2 | 165 | Do. |
| | 3.0 | +++ | +++ | +++ | +++ | +++ | +++ | | | Do. |
| | 2.0 | +++ | +++ | +++ | ++(+) | ++(+) | ++(+) | | | Do. |
| | 1.0 | +++ | +++ | +++ | +−− | +−− | ++(+) | | | Do. |
| | 0.5 | +−− | ++(+) | +++ | | | | | | Do. |
| 7 | 5.0 | +++ | +++ | +++ | +++ | +++ | +++ | 17.2 | 175 | Do. |
| | 3.0 | +++ | +++ | +++ | +++ | +++ | +++ | | | Do. |
| | 2.0 | +++ | +++ | +++ | +++ | +++ | +++ | | | Do. |
| | 1.0 | +++ | +++ | +++ | | | | | | Do. |
| | 0.5 | −−− | −−+ | +++ | | | | | | Do. |
| 8 | 5.0 | +++ | +++ | +++ | ++− | ++− | ++(+) | 16.2 | 185 | Do. |
| | 3.0 | +++ | +++ | +++ | ++− | ++− | ++− | | | Do. |
| | 2.0 | +++ | +++ | +++ | +−− | +−− | ++− | | | Do. |
| | 1.0 | +++ | +++ | +++ | | | | | | Do. |
| | 0.5 | −−− | ++− | ++(+) | | | | | | Do. |
| 9 | 5.0 | +++ | +++ | +++ | +++ | +++ | +++ | 17.6 | 170 | Do. |
| | 3.0 | +++ | +++ | +++ | ++(+) | ++(+) | +++ | | | Do. |
| | 2.0 | +++ | +++ | +++ | ++− | ++− | ++(+) | | | Do. |
| | 1.0 | ++(+) | +++ | +++ | | | | | | Do. |
| | 0.5 | −−− | ++(+) | ++(+) | | | | | | Do. |

*Softened water (2-3° dH).

We claim:

1. An aromatic sulfonamidocarboxylic acid or its water-soluble salt of the formula

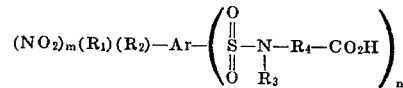

$$(NO_2)_m(R_1)(R_2)-Ar-\left(\begin{matrix}O\\\|\\S-N-R_4-CO_2H\\\|\phantom{xx}|\\O\phantom{xx}R_3\end{matrix}\right)_n$$

cal having three to 15 carbon atoms in the chain which may furthermore optionally be substituted by methyl or ethyl groups, and $m$ and $n$ are each 1 or 2.

2. An aromatic sulfonamidocarboxylic acid and its water soluble salt as defined in claim 1, wherein in the formula $R_1$, $R_2$, $R_3$, $m$ and $n$ have the defined meaning and $R_4$ represents an alkylene radical having five to 15 carbon atoms in the chain which may be substituted by methyl or ethyl groups.

* * * * *